United States Patent [19]

Reidelbach et al.

[11] 4,133,549
[45] Jan. 9, 1979

[54] LONGITUDINAL BEARER

[75] Inventors: Willi Reidelbach, Sindelfingen; Hermann Renner, Magstadt; Wolfgang Klie, Korntal, all of Germany

[73] Assignee: Daimler-Benz Aktiengesellschaft, Germany

[21] Appl. No.: 794,387

[22] Filed: May 6, 1977

[30] Foreign Application Priority Data

May 12, 1976 [DE] Fed. Rep. of Germany ....... 2620927

[51] Int. Cl.² ............................................. B62D 27/04
[52] U.S. Cl. ...................................... 280/784; 293/63
[58] Field of Search ...................... 280/106 R; 296/28; 293/DIG. 3, 63, 60; 213/1 A

[56] References Cited
U.S. PATENT DOCUMENTS

| | | | |
|---|---|---|---|
| 3,811,698 | 5/1974 | Glance | 280/106 R |
| 4,057,263 | 11/1977 | Schwuchow et al. | 280/106 R |

*Primary Examiner*—Richard A. Bertsch
*Attorney, Agent, or Firm*—Craig & Antonelli

[57] ABSTRACT

A longitudinal bearer of a motor vehicle frame, constructed as hollow profile which is provided with places for the introduction of chassis forces into the frame and into the longitudinal bearer and which includes a longitudinal bearer section arranged outside of the introduction places and dissipating deformable impact energy; this longitudinal bearer section, by reason of a differing wall thickness progress, has a resistance to buckling that increases in the direction toward the vehicle center; to that end at least the longitudinal bearer section located outside of the force introduction places is longitudinally subdivided over its length at least into two bearer parts consisting of sheet-metal profile members which are connected with each other along longitudinal seams, whereby the sheet-metal members have different wall thickness while the longitudinal seams extend obliquely to the longitudinal axis of the longitudinal bearer section such that the sheet-metal bearer member with greater wall thickness has a greater share in the circumference of the longitudinal bearer section in areas thereof located nearer the vehicle center than in areas thereof located nearer the end of the vehicle.

13 Claims, 5 Drawing Figures

LONGITUDINAL BEARER

The present invention relates to a longitudinal bearer of a motor vehicle frame that is constructed as hollow profile, with introduction places for introducing chassis forces into the frame and into the longitudinal bearer and with a deformable longitudinal bearer section arranged outside of the introduction places and dissipating impact energy, which by reason of a differing wall thickness course possesses a resistance to buckling that increases in the direction toward the respective vehicle center.

A longitudinal bearer with a differing wall thickness progress is illustrated, for example, in the German Offenlegungsschrift No. 2,421,233. The longitudinal bearer illustrated therein has a wall thickness that increases continuously over the length thereof and achieves thereby an increasing buckling resistance in the direction toward the vehicle center. In the case of a collision, at first the buckling or bulging resistance of the bearer is exceeded in the more thin-walled end-areas of the longitudinal bearer and the bearer will then bulge or buckle within this area. If the yieldingness is then exhausted by bulging or buckling within this area of the longitudinal bearer, then with a continuing collision force, the bulging or buckling limit is exceeded within the adjoining longitudinal bearer section located nearer the vehicle center which is still unbuckled or non-bulged and so on. By reason of the differing form-rigidity, it will thus lead to a relatively orderly progress of the bulging and buckling of the longitudinal bearer that commences in front and to an energy absorption continuing over the entire buckling distance, which is at a relatively high level. Simultaneously therewith, the bearer has also a high bending strength with low material costs because it can be made to readily approximate a bearer with the same bending strength.

However, it is disadvantageous with this type of longitudinal bearer construction that the varying wall thickness of the hollow profile can be manufactured only with difficulty. It involves an individual part which is manufactured in a complicated manner as special part by pressing or hollow-rolling and which is separately installed into the structure. By reason of the construction as individual part, problems of the force introduction into the bearer result which renders the entire chassis structure of the body quite complicated.

It is the aim of the present invention to indicate measures, on the basis of which the advantages of the known longitudinal bearer-namely, high material utilization as bending and buckling bearer as well as an orderly bulging behavior with a constant, high energy absorption capacity-remain preserved or are taken over, but which permit an avoidance of the aforementioned disadvantages—namely expensive manufacture as well as poor incorporation into the chassis structure.

Starting with the longitudinal bearer described hereinabove, the underlying problems are solved according to the present invention in that at least the longitudinal bearer section is longitudinally subdivided over its length into at least two bearer parts consisting of two sheet-metal profile members and connected with each other along longitudinal seams, whereby the sheet-metal members have a different wall thickness, and in that the longitudinal seams extend within the area of the longitudinal bearer section obliquely to the longitudinal axis of the longitudinal bearer section and the bearer parts are profiled correspondingly in such a manner that the bearer part with the greater wall thickness occupies a greater proportion in the circumference of the longitudinal bearer section within areas located closer to the vehicle center than in areas of the longitudinal bearer section located nearer the vehicle end.

By reason of the longitudinal subdivision of the bearer into profiled parts of different wall thickness and by reason of a predetermined, aimed-at change of the proportion of the larger wall thickness in the profile circumference, a good approximation of the rigidity variation and progress of the bearer to the known bearer can be achieved. However, owing to the longitudinal subdivision of the bearer, it can be manufactured from sheet-metal pressings or stampings in a manner favorable as regards manufacture. The sheet-metal pressings or stampings, in their turn, may pass over into wall parts of the body; a harmonic integration of the sheet-metal stampings into the chassis structure is therefore readily possible.

Problems of the force introduction and of the installation of the bearer into the chassis structure no longer exist in the present invention. With the construction of the longitudinal bearer according to the present invention, the connecting lines which connect the center of the moments of inertia of the area of all bearer cross sections—namely the neutral fiber—are located outside of the geometric axis of the bearer and extend at an inclination with respect thereto. This effect can be quite favorable for a controlled bulging or buckling of the bearer in the case of a collision because in case of a compression load, the bearer is always loaded eccentrically in a predetermined manner.

In the front area of a passenger motor vehicle, the longitudinal bearers are frequently arranged in direct proximity to a wheel casing sheet-metal member serving for the delimitation of a wheel casing. With such an arrangement, it is appropriate if the longitudinal bearer is longitudinally subdivided into two bearer parts along a longitudinal surface extending essentially vertically and if the thinner sheet-metal profiled member is made in one piece with the wheel casing sheet-metal member.

Within the rear area of a passenger motor vehicle, it is oftentimes somewhat different; for the most part the luggage-space floor sheet-metal member is arranged thereat in direct proximity to the longitudinal bearer. With such a chassis arrangement, the longitudinal bearer is longitudinally subdivided advantageously into two bearer parts along a longitudinal surface extending essentially horizontally and the thinner, sheet-metal profile member is then made in one piece with the floor sheet-metal member.

A relatively orderly bulging or buckling course of the longitudinal bearer results in case of collision already alone from the rigidity variation of the longitudinal bearer along the longitudinal axis and from the predetermined eccentricity of the neutral fiber and of the geometric axis of the bearer. In order to be able to control still better the bulging and/or buckling of the bearer in case of a collision, provision may be made that local, aimed-at weakened places or material non-homogeneities are provided along the longitudinal bearer section. These may be circumferential grooves or grooves within the edge area of the bearer. Holes may also be provided preferably within the edge area of the bearer. However, also local, aimed-at material treatments such as, for example, annealed strips or strengthened strips may be provided; increases in strength may be achieved by a local, aimed-at tempering or heat treatment or by a cold deformation, for example, by bending.

Accordingly, it is an object of the present invention to provide a longitudinal bearer which avoids by simple means the aforementioned shortcomings and drawbacks encountered in the prior art.

Another object of the present invention resides in a bearer which can be manufactured relatively simply and inexpensively, yet permits a good approximation in its strength and rigidity to the more complicated prior art bearer constructions.

A further object of the present invention resides in a longitudinal bearer which can be readily incorporated into the chassis frame and/or body of a self-supporting vehicle body.

Another object of the present invention resides in a longitudinal bearer which can be made from sheet-metal stampings or pressed-out parts involving relatively simple and inexpensive manufacturing operations.

These and further objects, features and advantages of the present invention will become more apparent from the following description when taken in connection with the accompanying drawing which shows, for purposes of illustration only, one embodiment of a longitudinal bearer in accordance with the present invention and wherein.

Figure 1:
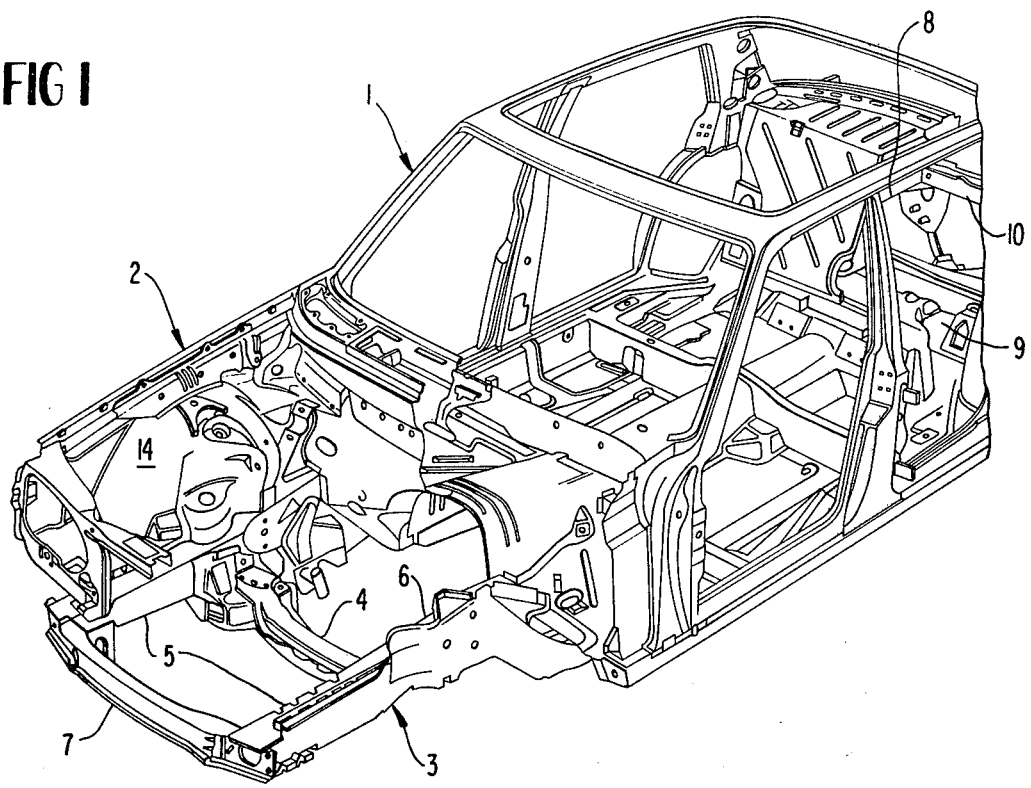
FIG. 1 is a perspective view of a self-supporting body provided with longitudinal bearers in accordance with the present invention.
Figure 2:
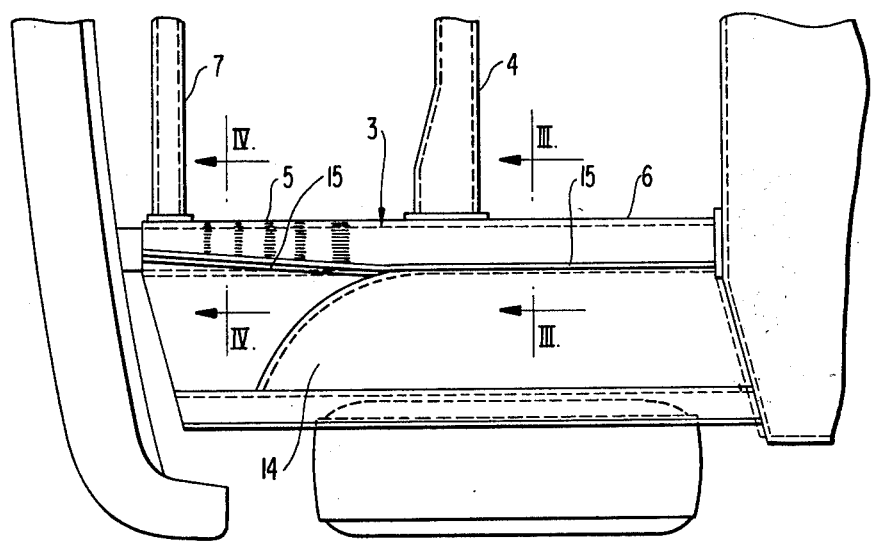
FIG. 2 is a top plan view on a forward portion of a somewhat simplified body with a forward longitudinal bearer longitudinally in accordance with the present invention which is longitudinally subdivided along a vertical surface.

Referring now to the drawing wherein like reference numerals are used throughout the various views to designate like parts, the illustrated passenger motor vehicle body includes a form-stable passenger cell generally designated by reference numeral 1 and a vehicle front portion generally designated by reference numeral 2 which in case of collision is adapted to be deformed in a predetermined aimed-at manner as well as a correspondingly constructed vehicle rear portion. An essential component of the frame of the self-supporting body is a pair of longitudinal bearers generally designated by reference numeral 3 constructed as hollow profile which are connected with each other, inter alia, by a cross bearer 4 and which, within the area of the vehicle front structure consist of two sections whose one outer section 5 is located in front of the cross bearer 4, i.e., in the direction toward the outside of the vehicle and whose other, inner section 6 lies inside of the cross bearer 4. Within the area of the forward cross bearer 4 the body is supported on the front axle (not shown), i.e., the inner longitudinal bearer 6 must absorb together with other supporting parts of the self-supporting body the vehicle weight. The outer longitudinal bearers 5 which are once again connected with each other at their outer side by a cross girder 7, carry essentially together with adjoining body parts exclusively the body parts located in front of the cross bearer 4 and absorb the longitudinal impacts on the bumper.

Figure 5:
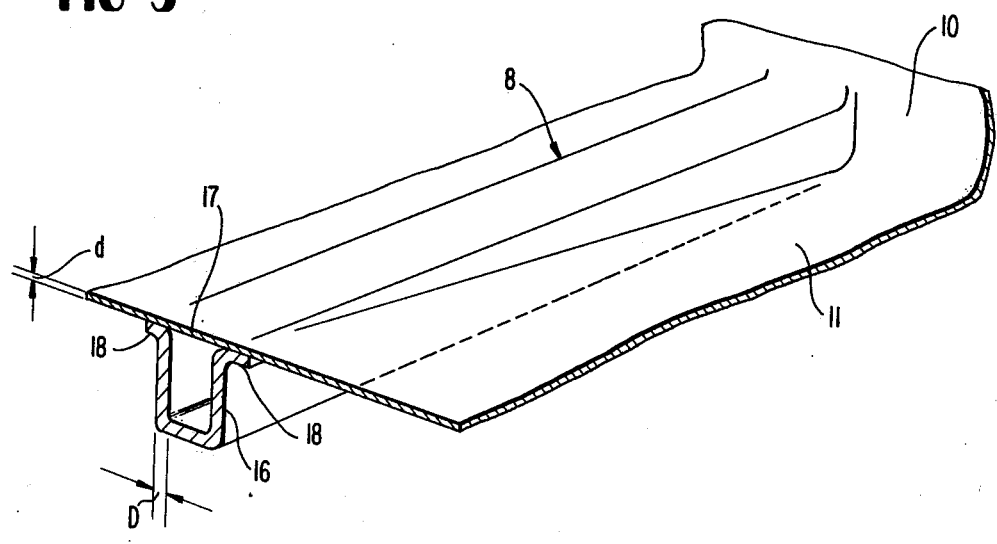
FIG. 5 is a partial perspective view on a rear longitudinal bearer in accordance with the present invention which is longitudinally subdivided along an approximately horizontally extending surface.

Within the area of the rear portion of the vehicle, also a pair of longitudinal bearers 8 (FIGS. 1 and 5) is provided, which extend outside of the area of the rear axle (cross bearer 9) and which are connected with each other by the floor sheet-metal member 11 of the luggage-space floor and by the luggage-space rear wall 10 (FIG. 5).

In addition to the other supporting body parts, above all the bearers of the body and of those, especially the longitudinal bearers are so constructed that in case of an impact load, they will bulge or buckle and yield under absorption and dissipation of the impact energy. The energy absorption capacity during the bulging or crash period is to remain thereby as uniform as possible at a predetermined relatively high but tolerable level. At the same time, however, the bearers should not be unnecessarily heavy and thick-walled.

For this reason, the hollow bearer formed of two parts is assembled of sheet-metal members of different thickness and the proportion of the thicker sheet-metal member is reduced toward the bearer end.

Figure 3:
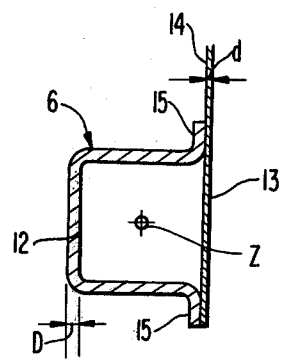
FIG. 3 is a cross-sectional view taken along line III—III of FIG. 2.

The forward longitudinal bearer 3 is longitudinally subdivided into two profile parts along an essentially vertically extending longitudinal surface. Within the area of the inner bearer section 6 (cross section III-III, FIG. 3) the proportion of the thicker sheet-metal profile member 12 having a wall thickness D in the profile circumference is about three-quarters and represents a very large contribution to the entire rigidity and strength of this bearer section. The other, smaller profile section in this bearer part is formed by a thin rectilinear sheet-metal member 13 having a wall thickness d which is a one-piece component of the wheel casing sheet-metal member 14. It represents only a quarter of the profile circumference and only a relatively small part of the bearer strength. The two longitudinally extending flange seams 15, by means of which the sheet-metal profile members 12 and 13 are connected, extend in the bearer section 6 essentially parallel to the bearer longitudinal axis, even though eccentrically thereto. The center Z of the area inertia moment of the cross section III—III—its neutral fiber—is shown in FIG. 3; it lies nearly centrally in the cross section.

Figure 4:
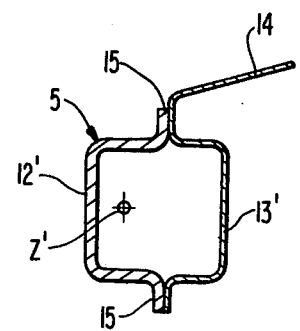
FIG. 4 is a cross-sectional view taken along line IV—IV of FIG. 2.

In the outer bearer section 5, the flange seams 15 are inclined to the bearer longitudinal axis and the thinner sheet-metal profile member 13' is increasingly profiled toward the bearer end, whereas in contrast, the profiling of the thicker sheet-metal profile member 12' decreases correspondingly. The proportion of the thicker sheet-metal profile member 12 in the bearer circumference and therewith the bearer rigidity itself is reduced thereby in the direction toward the bearer end. The center Z' of the area inertia moment of the cross section IV—IV is also shown in FIG. 4; it lies clearly eccentrically. The connecting line of all of these centers in the section 5 of the longitudinal bearer—the neutral fiber of the bearer section 5—will extend at an inclination to a side edge and therewith to the longitudinal axis of the bearer, but will certainly not be inclined so strongly to a lateral edge as the course of the flange seam 15.

By reason of the decreasing rigidity of the bearer toward the bearer end, it will bulge or buckle in case of collision beginning at the bearer end; the bulging or buckling process will extend in the impact direction along the bearer.

Similarly, as in the front portion, also the longitudinal bearer 8 in the rear portion is longitudinally subdivided into a thicker sheet-metal member profile 16 and into a thinner sheet-metal profile member 17. The longitudinal subdivision takes place in that case, however, along an essentially horizontally extending subdivision surface in order that the floor sheet-metal member 11 of the luggage-space floor can be utilized as the thinner sheet-metal profile member. The thinner sheet-metal profile member 17 includes a profiling that increases in the direction toward the end; the profiling of the thicker sheet-metal member 17 decreases correspondingly. The longitudinal seams 18 connecting the sheet-metal profile members extend at an inclination to the bearer longitudinal axis.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A longitudinal bearer of a motor vehicle frame which is constructed as a hollow profile and is provided with introduction places for introducing chassis forces into the frame and into the longitudinal bearer, comprising a longitudinal bearer section having a buckling resistance which increases in a direction toward the vehicle center, said longitudinal bearer section being formed of at least two longitudinally extending bearer parts, said bearer parts being profiled sheet-metal members connected with each other along longitudinal seams so as to define a hollow cross-sectional profile, wherein one of said bearer parts has a greater wall thickness than an opposing bearer part, and wherein the thicker bearer part defines a decreasing proportion of said cross-sectional profile in a longitudinal direction away from the vehicle center while said opposing bearer part defines a correspondingly increasing proportion of said cross-sectional profile in the direction away from the vehicle center.

2. A longitudinal bearer according to claim 1, in the front area of a passenger motor vehicle with a sheet-metal wheel casing means arranged in direct proximity of the longitudinal bearer for delimiting a wheel casing, characterized in that the longitudinal bearer is longitudinally subdivided into two bearer parts along a longitudinal surface extending generally vertically and in that the thinner profile sheet-metal member is made in one piece with the sheet-metal wheel casing means.

3. A longitudinal bearer according to claim 2, in the rear area of a passenger motor vehicle with a luggage space sheet-metal floor means arranged in direct proximity to the longitudinal bearer, characterized in that the longitudinal bearer is longitudinally subdivided into two bearer parts along a generally horizontally extending longitudinal surface and in that the thinner profiled sheet-metal member is made in one piece with the sheet-metal floor means.

4. A longitudinal bearer according to claim 2, characterized in that local intentional weakened places are provided along the longitudinal bearer section for favoring local deformations predetermined as to the shape thereof in case of a collision.

5. A longitudinal bearer according to claim 4, characterized in that material non-homogeneities are provided along the bearer section for favoring local deformations predetermined as to the shape thereof in case of collision.

6. A longitudinal bearer according to claim 5, in the rear area of a passenger motor vehicle with a luggage space sheet-metal floor means arranged in direct proximity to the longitudinal bearer, characterized in that the longitudinal bearer is longitudinally subdivided into two bearer parts along a generally horizontally extending longitudinal surface and in that the thinner profiled sheet-metal member is made in one piece with the sheet-metal floor means.

7. A longitudinal bearer according to claim 1, in the rear area of a passenger motor vehicle with a luggage space sheet-metal floor means arranged in direct proximity to the longitudinal bearer, characterized in that the longitudinal bearer is longitudinally subdivided into two bearer parts along a generally horizontally extending longitudinal surface and in that the thinner profiled sheet-metal member is made in one piece with the sheet-metal floor means.

8. A longitudinal bearer according to claim 1, characterized in that local intentional weakened places are provided along the longitudinal bearer section for favoring local deformations predetermined as to the shape thereof in case of a collision.

9. A longitudinal bearer according to claim 1, characterized in that material non-homogeneities are provided along the bearer section for favoring local deformations predetermined as to the shape thereof in case of collision.

10. A longitudinal bearer according to claim 1, wherein said opposing bearer part defines an increasing circumferential extent of said hollow cross-sectional profile in absolute terms in said direction away from the vehicle center.

11. A longitudinal bearer according to claim 10, wherein said thicker bearer part defines an increasing extent of said cross-sectional profile in absolute terms in said direction away from the vehicle center.

12. A longitudinal bearer according to claim 11, wherein said bearer parts meet along a longitudinal extending diagonal plane of the bearer.

13. A longitudinal bearer according to claim 1, wherein said bearer parts meet along a longitudinally extending diagonal plane of said bearer.

* * * * *